(12) United States Patent
Syed

(10) Patent No.: US 8,165,644 B2
(45) Date of Patent: Apr. 24, 2012

(54) SERVER INITIATED POWER MODE SWITCHING IN PORTABLE COMMUNICATION DEVICES

(75) Inventor: Zeeshan Syed, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 1273 days.

(21) Appl. No.: 11/847,051

(22) Filed: Aug. 29, 2007

(65) Prior Publication Data
US 2009/0061954 A1 Mar. 5, 2009

(51) Int. Cl.
*H04B 1/38* (2006.01)
(52) U.S. Cl. .......... 455/574; 455/418; 455/571
(58) Field of Classification Search .......... 455/115.3, 455/522, 574; 370/311, 318
See application file for complete search history.

(56) References Cited

U.S. PATENT DOCUMENTS

| | | | |
|---|---|---|---|
| 6,618,580 B2 * | 9/2003 | Parrott et al. .......... 713/310 |
| 6,909,823 B1 * | 6/2005 | Sorin et al. .......... 385/28 |
| 7,420,992 B1 * | 9/2008 | Fang et al. .......... 370/477 |
| 7,454,222 B2 * | 11/2008 | Huang et al. .......... 455/522 |
| 2004/0207655 A1 * | 10/2004 | Kang .......... 345/718 |
| 2005/0186926 A1 * | 8/2005 | Nhu .......... 455/222 |
| 2005/0229226 A1 * | 10/2005 | Relan et al. .......... 725/114 |
| 2006/0123262 A1 | 6/2006 | Bullman |
| 2006/0160508 A1 * | 7/2006 | Narayanaswami et al. .......... 455/151.2 |
| 2007/0264962 A1 * | 11/2007 | Ueno et al. .......... 455/343.2 |
| 2008/0055119 A1 | 3/2008 | Sadowski et al. |
| 2008/0059823 A1 | 3/2008 | Balatsos et al. |
| 2008/0170531 A1 * | 7/2008 | Petry et al. .......... 370/312 |
| 2009/0055284 A1 * | 2/2009 | Takayama .......... 705/26 |
| 2009/0109213 A1 * | 4/2009 | Hamilton et al. .......... 345/419 |
| 2010/0160000 A1 * | 6/2010 | Rofougaran .......... 455/572 |

FOREIGN PATENT DOCUMENTS

WO WO 2005071859 A1 * 8/2005

* cited by examiner

*Primary Examiner* — Dwayne Bost
*Assistant Examiner* — Inder Mehra
(74) *Attorney, Agent, or Firm* — Brent A. Boyd

(57) ABSTRACT

In a process, a power mode indicator is transmitted from a content server and is received by a Portable Communication Device (PCD). The indicator is indicative of a power mode potentially available to a circuit block in the PCD. The circuit block exhibits different levels of power consumption when operated in different power modes and is operated in the indicated power mode in response to the received power mode indicator. The content server may be a stream server. The circuit block may be operated in the power mode to receive/process a data stream.

29 Claims, 7 Drawing Sheets

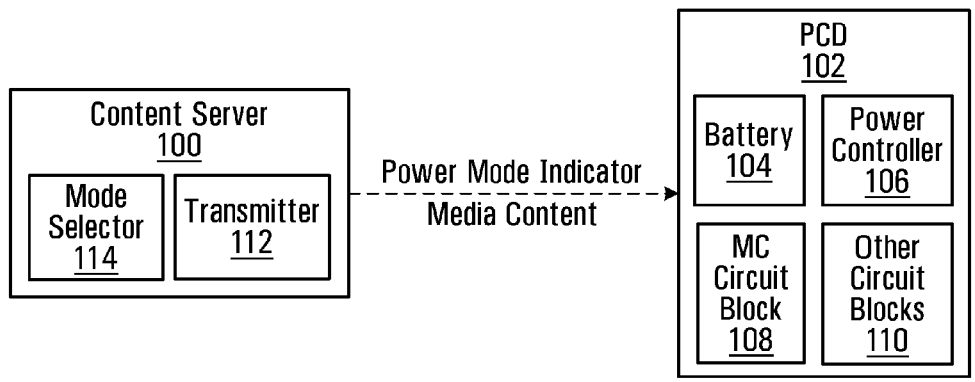
FIG. 1
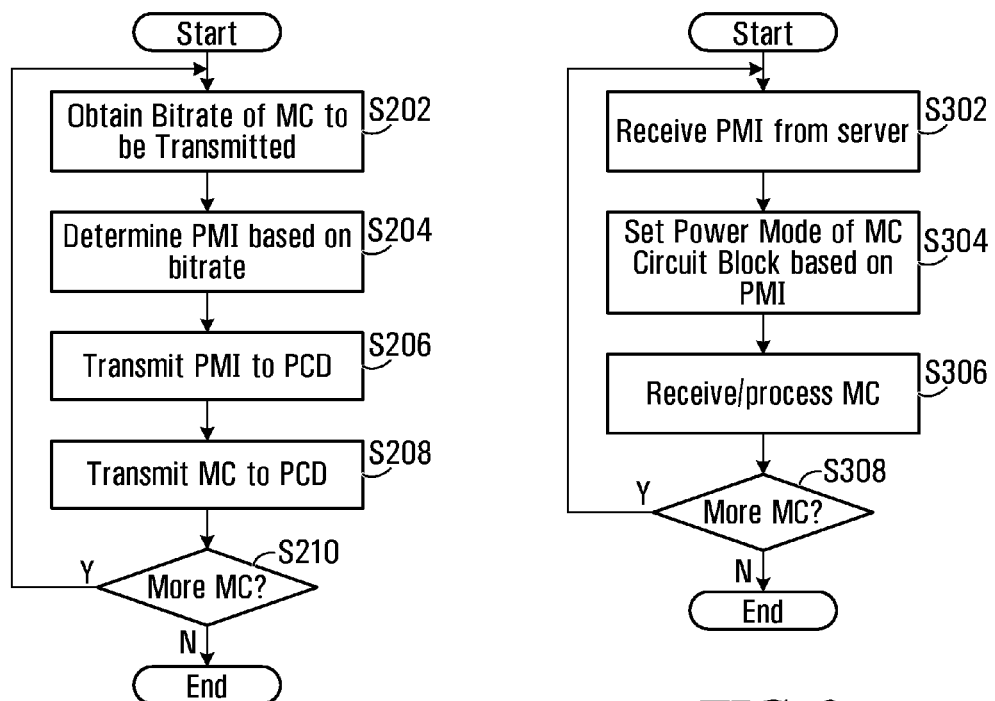
FIG. 2
FIG. 3

SERVER INITIATED POWER MODE SWITCHING IN PORTABLE COMMUNICATION DEVICES

FIELD OF THE INVENTION

The present invention relates to portable communication devices, servers that communicate with such devices, and methods of setting power modes in such devices.

BACKGROUND OF THE INVENTION

A portable communication device (PCD), also referred to as personal communication device, such as a cell phone is often powered by a battery, which has a limited lifetime. To extend the lifetime of the battery, a conventional PCD can automatically switch between low and high power consumption modes based on a given triggering event or condition. Different power modes can be selected depending on whether a particular component or function of the device is active or not. For instance, a cell phone may switch between an inactive mode and an active mode depending on whether the user is actively using the cell phone. The cell phone is normally set to an inactive, and low power consumption, mode when it is not actively used. The cell phone is set to an active, and high power consumption, mode when it is actively used, such as to make a phone call or to play media content received over a wireless network by way of data streaming.

Accordingly, it is desirable to provide alternative or improved power saving techniques for PCDs.

SUMMARY OF THE INVENTION

Power saving may be achieved in a PCD, such as a cell phone, by adjusting or setting the power mode in the PCD based on a power mode indicator received from a content server. The content server may be a stream server, and the PCD or a circuit block thereof may be operated in the power mode when playing media content streamed from the server. For instance, the power mode indicator may be determined based on one or more of the bitrate of the streamed data, a graphics resolution of the streamed video images, a compression ratio of the streamed data, and the like. The power mode indicator may indicate one of a number of pre-selected power levels, such as low and high, or low, medium and high. A functional circuit block in the device for receiving or processing the streamed data may be set to the indicated power mode, independent of the current power mode of the device or other functional circuit blocks of the device.

Accordingly, in accordance with an aspect of the present invention, there is provided a method of operating a portable communication device (PCD), comprising receiving, from a content server, a power mode indicator indicative of a power mode selected from a plurality of power modes available to a circuit block in the PCD, the circuit block exhibiting different levels of power consumption when operated in different ones of the power modes. The method also comprising operating the circuit block in the power mode in response to the received power mode indicator. The content server may be a stream server. The method may comprise receiving a data stream for a media content from the stream server; and processing the data stream for presentation of the media content to a user, as the data stream is being received, the circuit block operating in the power mode to perform at least one of the receiving and processing the data stream. The PCD may transmit to the stream server data indicative of a processing capacity, where a reduced power mode may be selected when the processing capacity is higher than needed to process the data stream. The power modes may comprise a full power mode and at least one reduced power mode.

In accordance with another aspect of the present invention, there is provided a method of operating a content server, comprising transmitting to a portable communication device (PCD) a power mode indicator indicative of a power mode that may be available to a circuit block in the PCD, the circuit block exhibiting different levels of power consumption when operated in different power modes; and transmitting data to the PCD. The content server may be a stream server. Transmitting data to the PCD may comprise transmitting a data stream for a media content to the PCD, while the data stream is received and processed by the PCD for presentation of the media content to a user and the circuit block is operated in the power mode to perform at least one of receiving and processing the data stream. The stream server may receive from the PCD data indicative of a processing capacity, and select a reduced power mode when the processing capacity is higher than needed by the PCD to process the data transmitted to the PCD.

In the above described methods, the power modes may include a full power mode and at least one reduced power mode. The power mode may be selected based on at least a bitrate of the data stream. The data stream may comprise compressed data, and the power mode may be selected based on at least a compression ratio of the compressed data. The media content may comprise video images and the power mode may be selected based on at least a graphics resolution of the video images. The data stream may comprise a television broadcast signal. The television broadcast signal may comprise a sideband, and the power mode indicator may be transmitted in the sideband. The PCD may communicate with the content server through wireless or wired communication.

According to another aspect of the present invention, there is provided a PCD comprising a circuit block operable in a plurality of power modes, the circuit block exhibiting different levels of power consumption when operated in different ones of the power modes; a receiver for receiving, from a remote content server, a power mode indicator indicative of a power mode selected from the plurality of power modes; and a power management module for setting the circuit block to operate in the power mode in response to receiving the power mode indicator. The content server may be a stream server. The circuit block may be operated in the power mode to perform at least one of receiving and processing streamed data for media content. The PCD may be a cellular telephone.

According to another aspect of the present invention, there is provided a content server. The content server comprises a power mode selector for selecting a power mode indicator indicative of a power mode selected from a plurality of power modes potentially available to a circuit block in a portable communication device (PCD), the circuit block exhibiting different levels of power consumption when operated in different ones of the power modes. The content server also comprises a transmitter for transmitting to the PCD the power mode indicator and data. The content server may be a stream server. The power mode indicator may be associated with a data stream for media content to be transmitted to the PCD such that the circuit block is operable in the power mode to receive or process, or both receive and process, the data stream for presentation of the media content to a user.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention, FIG. 1 is a block diagram illustrating communication between a content server and a portable communication device;

FIG. 2 is a flowchart of possible operations performed at the content server of FIG. 1;

FIG. 3 is a flowchart of possible operations performed at the portable communication device of FIG. 1;

DETAILED DESCRIPTION

Figure 4:
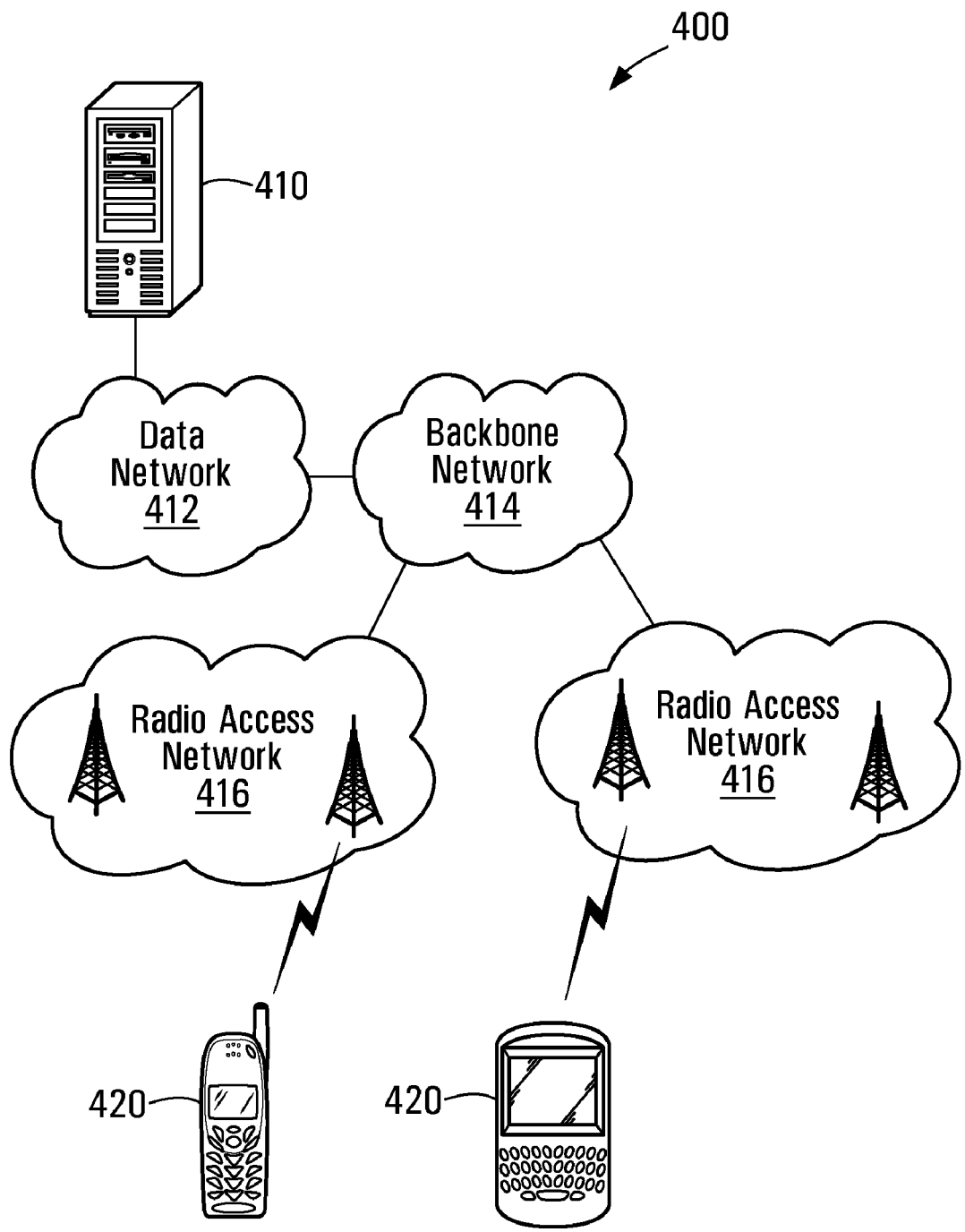
FIG. 4 is a schematic block diagram of a communications network.

FIG. 1 shows exemplary embodiments of the present invention, where media content (MC) is provided from a content server 100 to a portable communication device (PCD) 102. Media content may be transmitted from content server 100 to PCD 102 by way of data streaming, in which case, content server 100 may be a stream server.

Media content is any audio, visual or multimedia content that can be displayed or played, and may include a live feed, such as a television (TV) or radio broadcast signal. Media content may also include other content including other audio or video content. The media content may include music, songs, photographs, images, recorded video, movie, recorded or live events or shows, such as entertainment performances, TV shows, sporting events, news events, conferences, seminars, or lectures, and the like.

The phrase "content server" is used broadly herein and includes any signal originating or relaying device, apparatus, station, server, transmitter, or the like. For example, content server 100 may be a broadcast station such as a TV station, a cell phone network base station, an antenna for transmitting signal, another PCD or wireless device such as a cell phone or a media player, a home computer, entertainment device or the like. Content server 100 may include a transmitter 112 for transmitting data to PCD 102 and a power mode selector 114, the use of which will be come clear below.

PCD 102 may be any portable, mobile, or handheld electronic device that can communicate with a remote server and play media content. For example, PCD 102 may be a cellular telephone adapted to also play media content. Other portable or mobile devices such as Blackberry™ devices, short-message-service (SMS) devices, personal digital assistant (PDA) devices, portable computers, or the like may also be used as PCDs if they are capable of communicating with a remote content server to receive streamed media content and playing it.

As depicted in FIG. 1, PCD 102 may include a battery 104 for providing power thereto, a power management module such as power controller 106, and an electronic circuit powered by battery 104 which includes an MC circuit block 108 and other optional circuit blocks 110. MC circuit block 108 may be configured to process the streamed data for presentation of the media content carried by the stream to a user. Processing of the streamed data may include decoding the streamed data and presenting the media content decoded from the streamed data. MC circuit block 108 may include a receiver (not shown) for receiving streamed data from content server 100. Other circuit blocks 110 may be configured for performing other necessary or optional functions of the device, such as voice communication functions in a cell phone. A receiver (not shown) may be included in circuit blocks 110. While circuit blocks 108 and 110 are depicted as separate functional blocks in FIG. 1, the actual circuits for them may be separate or integrated.

During data streaming, data for the media content is transmitted from a first location, such as content server 100, to a second location, such as PCD 102, while the media content is being displayed or played at the second location, such as PCD 102. The transmitted stream may also be continuous. The term "continuous" or "continuously" does not necessarily require that the transmission of data is constant. A continuous transmission may include relatively short intervals of non-transmission or idle time, either regularly or irregularly. As can be appreciated, short interruptions of data transmission are common in network or wireless transmission. The data stream for the media content may be transmitted over a network such as a wireless network or cellular network, as will be further described below.

It is typical to compress the content data for transmission by data streaming, such as to increase transmission speed or reduce the bandwidth required for its transmission. Thus, during data streaming, PCD 102 may perform several functions including communicating with the content server 100 to receive the compressed content data, decompressing the compressed data as it is received, and playing the decompressed content data. MC circuit block 108 of PCD 102 may include one or multiple separate functional blocks for performing one or more of these functions, as will be further described below.

PCD 102 may be capable of receiving and displaying different types of media content, including both audio and video contents. Different media contents may require different processing powers during data streaming. For example, the compression ratio is typically higher for high resolution video data than for audio data or low resolution video data. Further, high resolution video may require higher transmission speed than audio or low resolution video do. In addition, displaying high resolution video or graphics may require more calculation by a graphics-rendering circuit at PCD 102. Consequently, the processing power required to receive, decompress/decode, and display/play different media contents can vary. To conserve battery power during data streaming, one or more of the relevant functional circuit blocks of PCD 102, such as MC circuit block 108 may be set to one of a number of pre-selected power modes, based on a power mode indicator (PMI) received from content server 100. When operated in different power modes, MC circuit block 108 exhibits different levels of power consumption. The value of the PMI may be determined by mode selector 114 of content server 100, as will be described further below.

The pre-selected power modes may include a low power mode and a high power mode. The high power mode may be a full power mode, and the low power mode is a reduced power mode. Optionally, the power modes may include multiple reduced power modes, such as a low power mode and a medium power mode. In different embodiments, more than three modes may be made available.

The PMI may be implemented in any suitable manner as can be understood by those skilled in the art. For example, the indicator may include a single digit, which may have a binary value such as "0" or "1", where "0" may indicate a low power mode and "1" may indicate a high power mode.

The PMI may be determined based on one or more factors that can affect power consumption. One factor that can affect power consumption is the bitrate of the media content to be transmitted and played. Bitrate typically refers to the number of bits that are transmitted or processed per unit time. For multimedia content, bitrate may refer to the number of bits used per unit time to represent a continuous signal such as audio or video signal. For a given media content that is compressed, the bitrate may vary depending on the data compression technique. Contents with a higher bitrate may require more power to transmit, decode and play. The compression ratio of the streamed data can also affect power consumption. A higher compression ratio may mean that more power is needed to decompress the data. Another factor is the graphics resolution of the visual images included in the media content. A still or video image with higher resolution may require more power to process such as decode or display.

For illustration purposes only, in the description below it is assumed that the PMI is determined based on the bitrate of the media content. The following description may be readily modified by those skilled in the art for situations in which other factors are considered for determining the PMI.

In one embodiment, mode selector 114 may be configured to determine the PMI based on a bitrate for the segment of data stream to be transmitted next. The bitrate may be specified in a header portion of the data stream, or be obtained from a separate source such as a database. Mode selector 114 may be adapted to determine the PMI by comparing the bitrate with a threshold. For example, when the bitrate is higher than the threshold, the PMI may be set to "1" and when the bitrate is lower than the threshold, the PMI may be set to "0". The threshold may be pre-selected and stored at content server 100, or a remote location accessible by mode selector 114. Alternatively, the threshold may be dynamically determined, such as based on information received from PCD 102. For instance, processing capacity information of PCD 102 may be transmitted to content server 100 so that the threshold can be determined based on such information.

Optionally, mode selector 114 of content server 100 may be adapted to obtain from PCD 102 the available power modes or possible values of the PMI. Mode selector 114 may also obtain, such as from PCD 102, information related to correlation between the bitrate and the values of PMI. Content server 100 may also maintain or communicate with a database of possible types of PCD devices and the necessary data or information for determining the PMI for each particular type of PCD device. Thus, once the type of the PCD device is identified, the information necessary for obtaining the PMI based on a given bitrate may be retrieved and used by mode selector 114 in subsequent operations.

The PMI, once determined, may be transmitted from content server 100 to PCD 102 in any suitable manner. For instance, the indicator may be embedded in the header portion of the media content data stream, or in a sideband of a TV signal when the transmitted media content is TV broadcast signal.

As can be appreciated, mode selector 114 may be implemented in either software or hardware, or a combination of both. Mode selector 114 and transmitter 112 may be integrated or may be provided as separate components. Mode selector 114 and transmitter 112 may be located at the same location or at different locations.

During operation, content server 100 and PCD 102 may respectively operate as illustrated in FIGS. 1 to 3, where FIG. 2 illustrates possible operations performed at content server 100 and FIG. 3 illustrates possible operations performed at PCD 102.

As illustrated, a communication channel is established between content server 100 and PCD 102 for transmitting data therebetween, including data for media content.

Before a segment of media content is transmitted, content server 100 obtains a bitrate associated with the segment of media content about to be transmitted (at S202) and determines the PMI based on the bitrate (at S204), as described above. For illustration purposes, it may be assumed that a fixed bitrate threshold has been pre-selected and the bitrate of the media content is compared with the threshold. In an exemplary case where the bitrate is assumed to be lower than the threshold, the PMI may be selected to have a value of "0", indicating the low power mode.

The PMI is then transmitted to PCD 102 (at S206).

PCD 102 receives the PMI (at S302) and sets the power mode of circuit block 108 based on the value of the PMI (at S304). In the exemplary case, the power mode may be set to the low power mode. Alternatively, or additionally, PCD 102 may use other factors in addition to the value of the PMI to set the power mode of PCD 102. Such other factors may include, for example, other applications or power consuming clients that may be operating on PCD 102 in addition to the application that is to be used to process the transmitted content.

Content server 100 transmits the associated segment of the media content to PCD 102 (at S208), which is received, decoded and presented at PCD 102 at S306 while circuit block 108 is operated in the selected power mode. In the exemplary case, PCD 102 will process the segment of streamed data while circuit block 108 is in the low power mode.

If there is a further segment of media content to be streamed (determined respectively at S210 and S308), the above process is repeated at content server 100 and PCD 102 respectively. Otherwise, the process of data streaming may be terminated.

In different embodiments, a segment of MC may have a pre-determined length of display time, file size, or the like, and may be marked by starting and ending data bits embedded in the streaming data. The PMI itself may serve as the starting or ending marker. Thus, the end of a segment can be determined accordingly.

As discussed above, the header field of each data packet may include a bit field for PMI, where the bit may represent a high (1) or a low (0) power mode. In an alternative embodiment, when there are only two possible power modes available, the header field may include a PMI bit representing toggle (1) or no-toggle (0). In such a case, when two consecutive segments of media content can be processed in the same power mode, the PMI bit may be set to "0" to indicate no switch of power mode is needed, and when the two segments require different power modes to process, the PMI bit may be set to "1", indicating a switch of power mode is needed.

It may not be necessary to change the power mode when there is no change in the bitrate, compression ratio, and image resolution in the streamed data. In such a case, the PMI bit may be set to the previous value or set to "no-toggle". When one or more of the relevant parameters for the next segment change, the PMI bit may be set to a new value or set to "toggle".

It may now be appreciated that in some embodiments, the bitrate of the multimedia content may be a more accurate measure of the average power consumption requirement than the bitrate of data transmission. In some embodiments, the two bitrates may be different and may be both considered for determining the PMI.

FIG. 4 illustrates a communications network 400, exemplary of embodiments of the present invention. Communications network 400 includes a streaming server 410 that may stream multimedia data through a data network 412, a backbone network 414, and a radio access network 416 to a portable communication device (collectively and individually referred to as PCD 420). Multimedia data may include video or audio data, or both, that may be presented or displayed to a user of a PCD 420.

The streaming server 410 is interconnected to data network 412, which transfers data to backbone network 414. As will be appreciated by a person of ordinary skill, data network 412 may be any data communication network such as the Internet, an Intranet, a local area network, and the like. Data network 412 may employ known network protocols such as TCP/IP and RTP/RTSP. Backbone network 414 may be any high capacity network that joins multiple networks together. As shown in FIG. 4, backbone network 414 joins data network 412 and radio access networks 416 together.

As will be appreciated by a person of ordinary skill, radio access network 416 may be any type of mobile communications network, employing various network architectures and protocols such as those set out in mobile communications standards such as GSM, CDMA, GPRS, EDGE, W-CDMA, EVDO and the like. One or more radio access networks 416 may be included. Different radio access networks may provide different services.

Each PCD 420 is connected to a radio access network 416 via an air interface, which provides PCD 420 with access to communications data such as multimedia streaming data that originates from streaming server 410.

In operation, multimedia streaming data is sent to data network 412 by streaming server 410. The source of the streaming data may be a live feed source. A live feed may be from a signal source such as a TV broadcast station, a microphone or video camera. The source of the streaming data may also be pre-recorded multimedia data that is stored on persistent storage memory in streaming server 410 or other electronic storage medium, such as an optical disk.

Streaming data may be first compressed and encoded before being sent by streaming server 410 to data network 412. As will be appreciated by a person of ordinary skill, streaming data may be encoded using a variety of data formats including MPEG-4, Windows Media Video, Quicktime, RealVideo, MP3, and the like.

PCD 420 may be a cellular telephone, personal digital assistant, portable computer, other mobile handheld device, or the like. Due to differences in processing power and display capabilities of such different portable electronic devices 420, streaming data may first undergo transcoding in order to adapt streaming data for proper display and presentation on a PCD 420. The transcoding process may include the conversion of multimedia data into a different data format, or adjusting data properties such as data bit rate, frame rate, or frame size. Transcoding occurs before streaming data is received by PCD 420, and may be implemented, for example, on streaming server 410.

Figure 5:
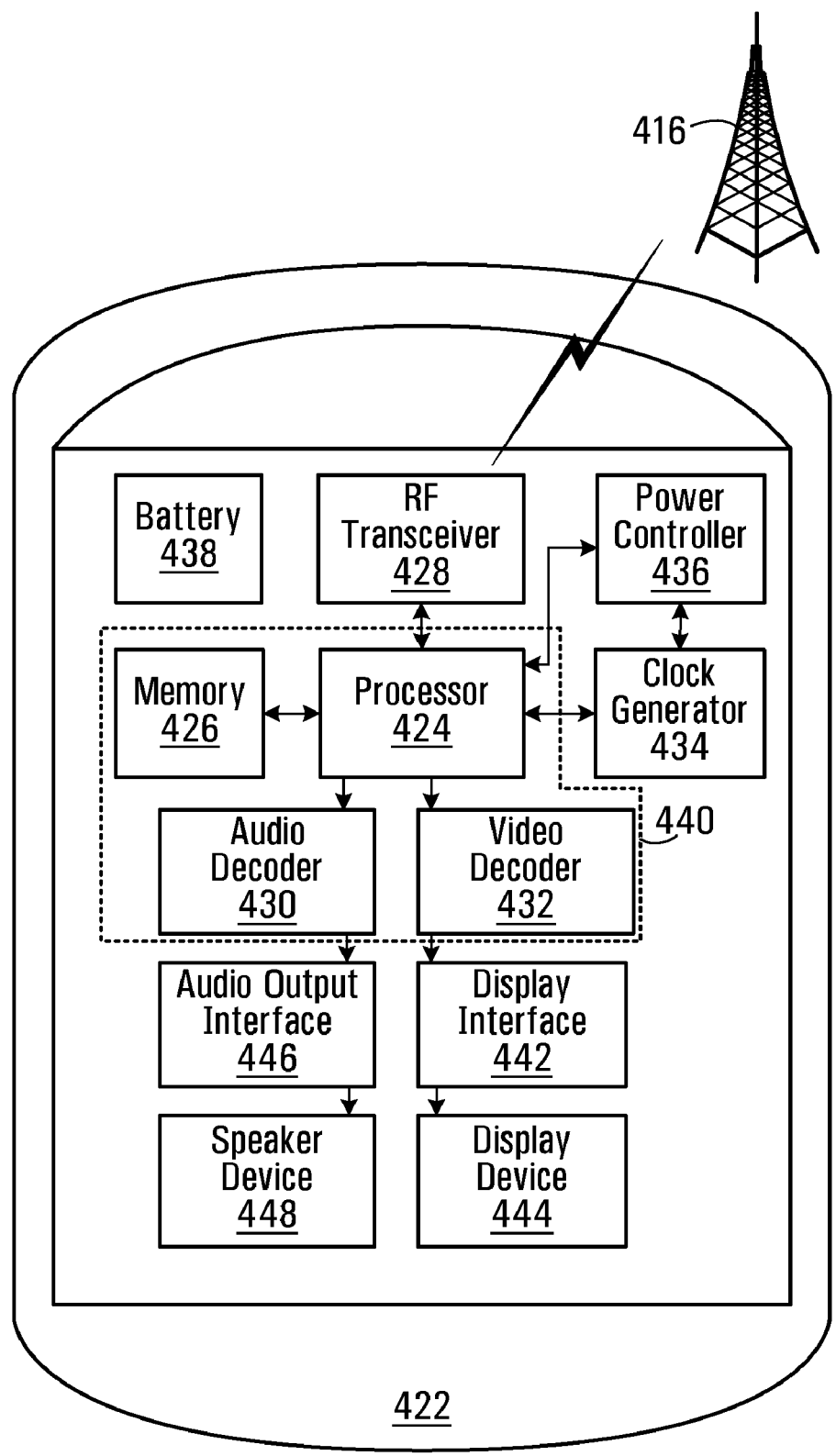
FIG. 5 is a schematic block diagram of a portable communication device shown in FIG. 4.

FIG. 5 illustrates in more detail an exemplary embodiment of PCD 420, a handheld communication device 422. As illustrated, device 422 includes interconnected processor 424, memory 426, and RF transceiver 428. RF transceiver 428 is adapted to send and receive signals via an air interface connection with radio access network 416. Processor 424 is adapted to process communications signals and control the operation of RF transceiver 428, and other components of device 422. The other components may include an audio decoder 430, video decoder 432, clock generator 434, and power controller 436, each of which may be interconnected with processor 424. Device 422 also includes a battery 438 as a power source for providing power to the components of device 422. Power controller 436 may control the operation of battery 438 and the power modes in which different components of device 422 operate.

Processor 424 and decoders 430, 432 may form part of a circuit block 440 for processing streamed data. As depicted, memory 426 is optionally included in the same circuit block. In alternative embodiments, RF transceiver 428 may also be included in block 440.

In the depicted embodiment, audio decoder 430 and video decoder 432 are circuits suitable for receiving digital signals from processor 424 and decoding such signals for eventual display on device 422. Video decoder 432 is interconnected to display interface 442, which converts video signals into a suitable format for display on display device 444. Similarly, audio decoder 430 is interconnected to audio output interface 446, which converts audio signals into a suitable format for output on speaker device 448.

Clock generator 434 produces a timing signal that drives the operation of processor 424. Timing signals of varying frequency may be generated by clock generator 434, in order to speed up or slow down the operation of processor 424. Clock generator 434 may include a phase-lock loop (PLL). Clock generator 434 may also provide timing service to memory 426, video decoder 432, audio decoder 430, display interface 442 and audio output interface 446.

Power controller 436 may be interconnected to clock generator 434. Power controller 436 may throttle clock generator 434 or otherwise place processor 424 into a reduced power consumption mode. Power controller 436 may also provide voltage throttling, resource hibernation, or selective supply of power to various functional or circuit blocks in device 422. For example, power controller 436 may switch off power supply to an unused/inactive block, e.g. using a technique known as power islands methodology. Power controller 436 may also provide power supply at different voltages to different blocks (known as voltage islands methodology).

It is possible for device 422 to receive, process, decode and display multimedia streams in a reduced power consumption mode. This is possible where the multimedia stream has been encoded, or transcoded into a format that does not require device 422, or the circuit block 440, to operate at its full processing capacity.

The processing capacity may be affected by a number of factors including for example, processor speed, free memory available to processor 424, and the available air interface bandwidth between radio access network 416 and device 422.

During operation, in manners exemplary of the present invention, the streaming server 410 may determine the processing requirements for decoding and displaying a multimedia stream. If the processing requirements are less than the full processing capacity, a low power mode indicator is sent by streaming server 410 to device 422, such as in a manner similar to that described above with reference to the embodiment shown in FIGS. 1 to 3.

In response to receiving the low power mode indicator, device 422 (or circuit block 440) enters a lower power mode to decode and display the multimedia stream received from streaming server 410. By placing device 422 in a lower power consumption mode to process multimedia streams that do not require device 422 to operate at its full processing capacity, overall power consumption is reduced. An example of such a lower power consumption mode may include a mode with a lower clock frequency, or a lower operation voltage for processor 424.

Figure 6:
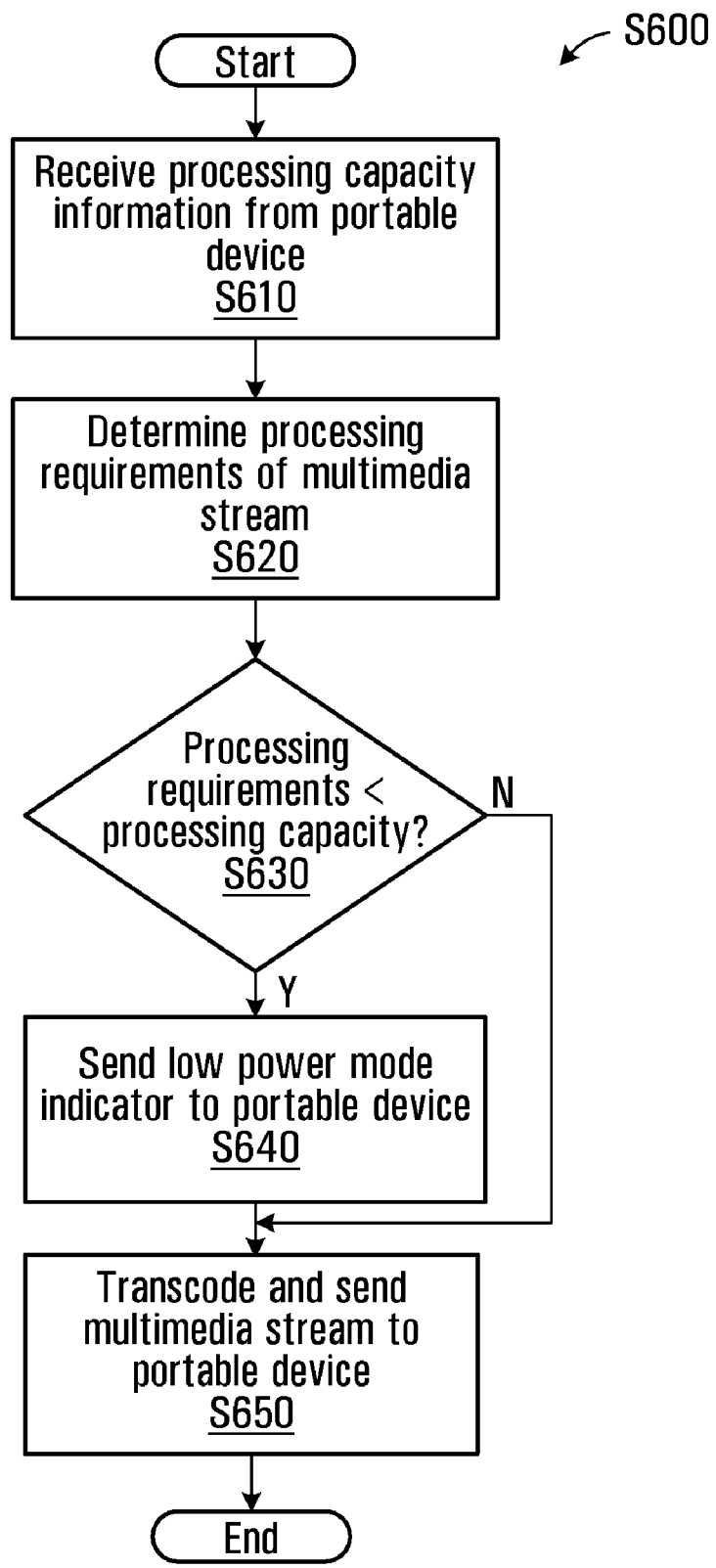
FIG. 6 is a flowchart of possible operations performed by the streaming server shown in FIG. 4.

FIG. 6 illustrates possible operations S600 performed by streaming server 410 in manners exemplary of an embodiment of the present invention.

At S610, streaming server 410 receives processing capacity information from device 420. The processing capacity may be measured using various metrics, either alone or in combination. For example, the instruction processing speed of processor 424 may be expressed as the rate at which data is processed in the form of a metric such as bitrate (e.g. in unit of bits per second), or frame rate (frames per second). In one example, the bitrate alone may be used to measure the processing capacity. Alternative metrics such as MIPS (millions of instructions per second) or MHz (millions of processor clock cycles per second) may also be used. The processing capacity information may be presented in the form of a threshold.

At S620, the processing requirements of a multimedia stream is determined by streaming server 410. A metric similar to that used at S610 for the processing capacity, such as the bitrate, may be used. The required processing capacity to decode and display a given multimedia stream may be dependent on a number of properties of the multimedia stream. For example, a video data stream using a higher bitrate, larger frame size, or higher frame rate may require greater processing capacity to decode and display. However, as will be appreciated by a person of ordinary skill, the particular data encoding format used to encode a multimedia stream may mean that a lower bitrate requires greater processing capacity. For example, an encoding method with a more complex compression scheme may result in a lower bitrate data stream, but require more processing cycles to decompress and decode.

In some situations, it is not necessary for device 422 to operate at its peak processing levels in order to process all multimedia streams. At S630, the processing requirements of a multimedia stream (determined at S620) is compared to the processing capacity of portable electronic device 422 (information received at S610). If the processing capacity of device 422 is greater than the processing requirements of the multimedia stream, power may be saved by placing device 422, or at least a portion of it such as circuit block 440, in a lower power mode.

Accordingly, at S640, if the processing capacity is greater than the processing requirements of the multimedia stream, a low power mode indicator is sent by streaming server 410 to device 422. The power mode indicator may be embedded in the multimedia streaming data or may be sent as a separate signal to 422. The power mode indicator may specify a particular voltage or speed at which processor 424 may operate in order to process the upcoming multimedia stream. For example, a low power mode indicator may include a value indicating a preset mode, a lower voltage, or a lower processing speed (such as in MIPS or MHz). The preset mode may be one of a set of pre-determined power modes in which device 422 can operate.

If full power is required to process the stream data, the power mode indicator may indicate a high, such as full, power mode. In this case, it is not necessary for the indicator to indicate any particular operating parameter such as processor speed or voltage.

At S650, the multimedia stream undergoes transcoding, which may include the conversion of multimedia data into a different data format, and the adjustment of data properties such as data bitrate, frame rate, or frame size. The transcoding process may be implemented on streaming server 410, or on an intermediate server on the communications path to device 422. The transcoded multimedia data is then sent to device 422.

Figure 7:
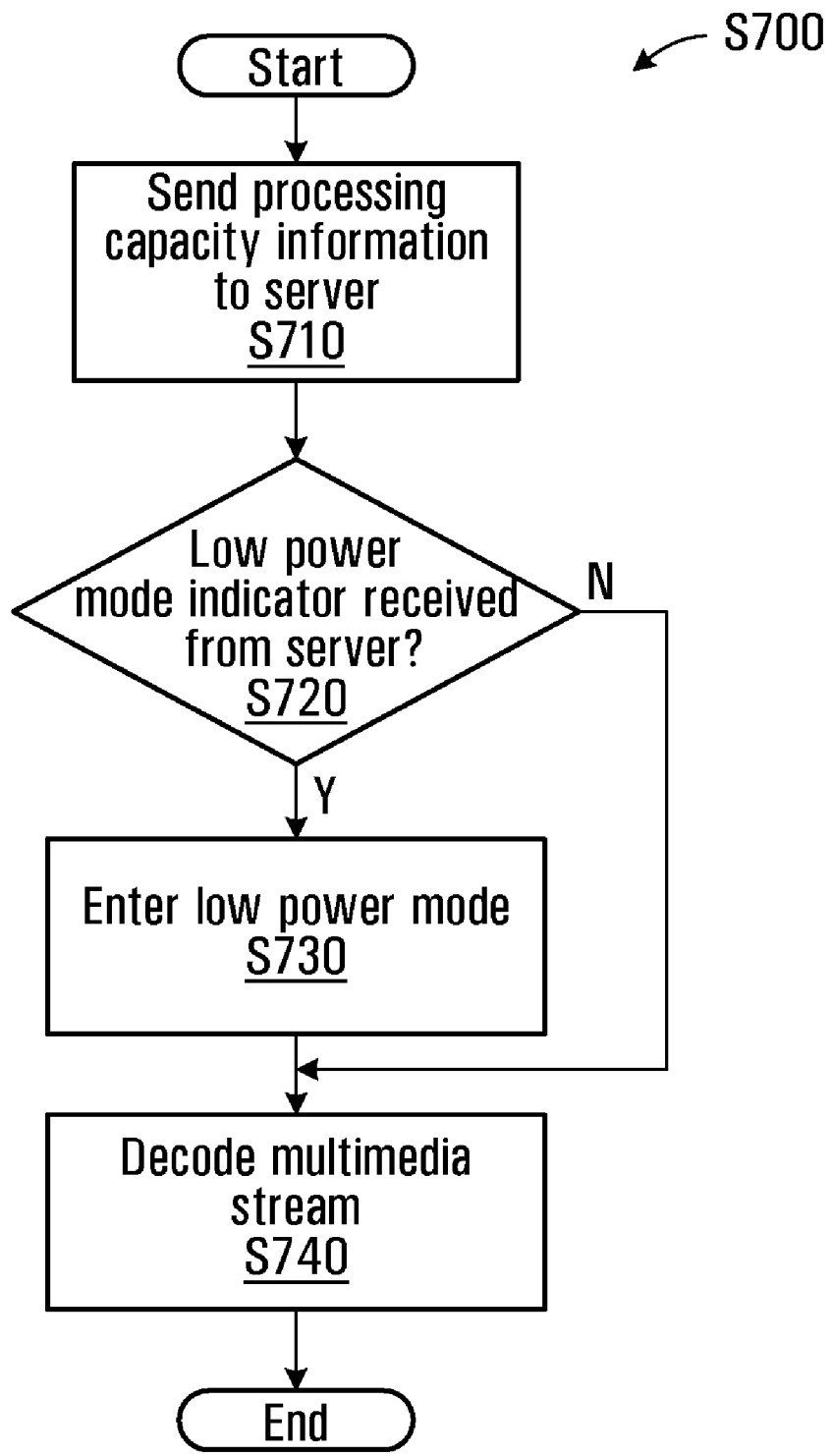
FIG. 7 is a flowchart of possible operations performed by the device of FIG. 5.

FIG. 7 illustrates possible operations S700 performed by device 422. At S710, device 422 sends processing capacity information to streaming server 410. Device 422 may maintain various information related to its capabilities, including for example, processor speed, operation voltage, the amount of memory available to processor 424, and the available air interface bandwidth between radio access network 416 and device 422. Such processing capacity information may be sent to streaming server 410, when the transmission connection between device 422 and streaming server 410 is initially established. For example, the maximum processing speed of processor 424 in bitrate, MIPS or MHz may be sent to streaming server 410. Device 422 may also re-send updated processing capacity information to streaming server 410 during the period in which the transmission connection is maintained, such as periodically or when there is a change. For example, the processing capacity of block 440 may change due to activities of other components or a change in operation conditions.

At S720, device 422 determines whether a low power mode indicator has been received from streaming server 410. If so, power controller 436 may place device 422 (or block 440) into a lower power mode at S730 prior to decoding the multimedia stream at S740. The lower power mode may include lower processor operation voltage, or processing speeds by reducing the frequency of the timing signal produced by clock generator 434. For example, the low power mode indicator received from streaming server 410 may specify a particular voltage, or processor speed such as in bitrate. In some embodiments, the speed may be measured in MIPS or MHz. By reducing unnecessary processing cycles by lowering the operating voltage or the frequency of clock generator 434 to match the processing requirements determined by streaming server 410, the overall power consumption by device 422 may be reduced, thus increasing the lifetime of battery 438.

The processor operation voltage or speed may be adjusted with small increments. However, in some embodiments, it may be advantageous to adapt device 422 so that circuit block 440 can operate in a small number of pre-determined power modes for different and discrete voltage or speed levels within a given range. Device 422 may be adapted to operate in each one of the pre-determined power modes, for decoding and displaying multimedia streams with specific but different processing requirements. The power mode indicator may specify one of these pre-determined power modes. Furthermore, each of the pre-determined power modes may include the use of clock gating, voltage throttling, resource hibernation, power islands, voltage islands, and other known manners of power reduction of electronic components.

Figure 8:
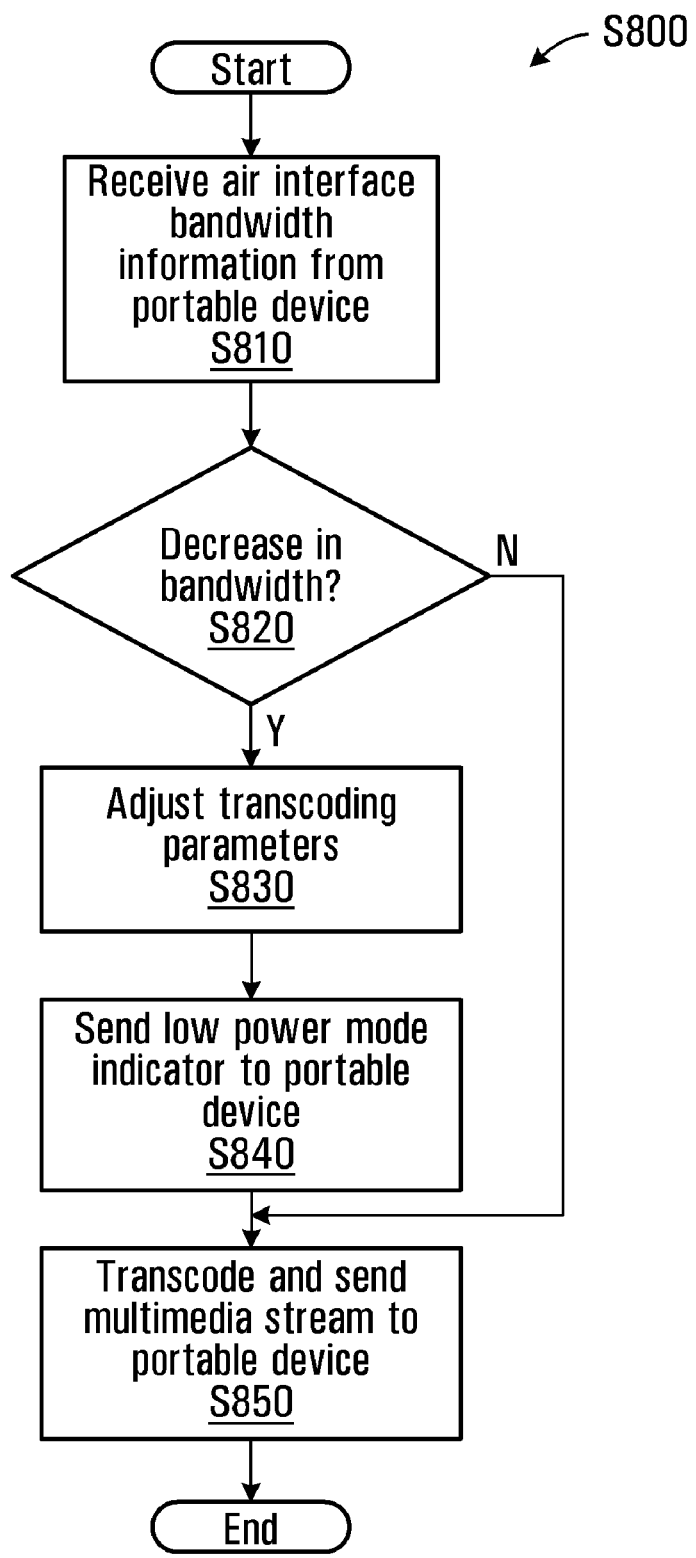
FIG. 8 is a flowchart of alternative operations performed by the streaming server of FIG. 4.

FIG. 8 illustrates alternative possible operations S800 performed by streaming server 410 in manners exemplary of an embodiment of the present invention.

At S810, streaming server 410 receives processing capacity information from device 422, specifically the available air interface bandwidth between radio access network 416 and device 422. This information may be received periodically, or in response to switching to a new radio access network 416, in order to determine any changes in the available bandwidth. For example, the available air interface bandwidth may decrease due to a mobile user moving into a geographical area causing device 422 to switch to a network with lower bandwidth. Available bandwidth may also decrease due to poor radio reception or a change in the traffic load conditions of radio access network 416. A decrease in bandwidth may result in a decrease in the multimedia stream processing capacity of device 422. The maximum transmission bitrate may change due to the change in bandwidth.

At S820, if a decrease in available air interface bandwidth is detected, multimedia stream transcoding parameters are adjusted at S830. For example, if the decrease in bandwidth results in an air interface that is unable to support the bitrate of the multimedia stream, various transcoding parameters such as frame size or frame rate may be decreased in order to provide a multimedia stream with a lower bitrate that can be successfully transmitted over the air interface. Since a lower bitrate may mean that the full processing capacity of device 422 is no longer needed, a power mode indicator indicating a low power mode is sent by streaming server 410 to device 422 at S840.

At S850, the multimedia stream undergoes transcoding and is sent to device 422.

Figure 9:
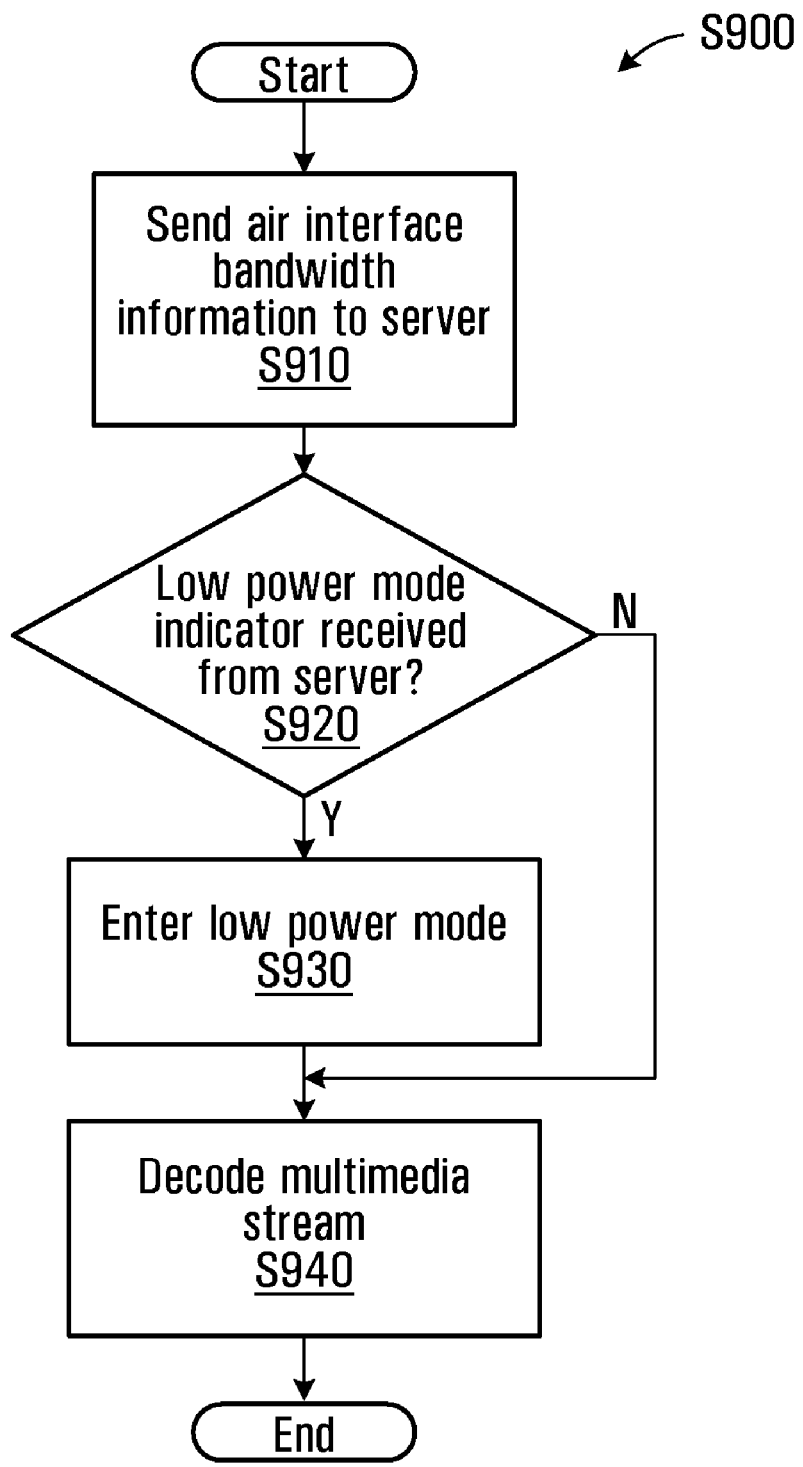
FIG. 9 is a flowchart of alternative operations performed by the device of FIG. 5.

FIG. 9 illustrates corresponding alternative possible operations S900 performed by device 422. At S910, device 422 sends processing capacity information to streaming server 410, specifically the available air interface bandwidth between radio access network 416 and device 422. Device 422 may periodically send processing capacity information updates to streaming server 410 in order to allow streaming server 410 to determine any changes in the available bandwidth.

At S920, device 422 determines whether a low power mode indicator has been received from streaming server 410. If so, power controller 436 may place device 422 into the corresponding low power mode at S930 prior to decoding the multimedia stream at S940.

Once the multimedia data is decoded, the decoded data may be presented to the user.

As can be appreciated, in embodiments of the present invention, a content server may transmit media content to a single PCD or may broadcast media content to a number of PCDs.

Other features, benefits and advantages of the embodiments described herein not expressly mentioned above can be understood from this description and the drawings by those skilled in the art.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of operating a portable communication device (PCD), comprising:
   receiving at the PCD, from a content server for transmitting media content, a power mode indicator indicative of a power mode selected from a plurality of power modes available to a circuit block in said PCD, said circuit block exhibiting different levels of power consumption when operated in different ones of said power modes; and
   operating said circuit block in said power mode in response to said received power mode indicator.

2. The method of claim 1, wherein said plurality of power modes comprises a full power mode and at least one reduced power mode.

3. The method of claim 1, wherein said content server is a stream server.

4. The method of claim 3, further comprising receiving a data stream for a media content from said stream server; and processing said data stream for presentation of said media content to a user, as said data stream is being received, said circuit block operating in said power mode to perform at least one of said receiving and processing said data stream.

5. The method of claim 4, wherein said power mode is selected based on at least a bitrate of said data stream.

6. The method of claim 4, wherein said data stream comprises compressed data, and said power mode is selected based on at least a compression ratio of said compressed data.

7. The method of claim 4, wherein said media content comprises video images and said power mode is selected based on at least a graphics resolution of said video images.

8. The method of claim 7, wherein said data stream comprises a television broadcast signal.

9. The method of claim 8, wherein said television broadcast signal comprises a sideband, said power mode indicator being transmitted in said sideband.

10. The method of claim 4, comprising transmitting to said stream server data indicative of a processing capacity, and wherein one of said least one reduced power mode is selected when said processing capacity is higher than needed to process said data stream.

11. The method of claim 1, wherein said PCD communicates with said content server through wireless communication.

12. A method of operating a content server for transmitting media content, comprising:
   transmitting to a portable communication device (PCD) a power mode indicator indicative of a power mode that may be available to a circuit block in said PCD, said circuit block exhibiting different levels of power consumption when operated in different power modes; and
   transmitting data to said PCD.

13. The method of claim 12, wherein said power modes comprise a full power mode and at least one reduced power mode.

14. The method of claim 13, comprising receiving from said PCD data indicative of a processing capacity, and selecting one of said least one reduced power mode when said processing capacity is higher than needed by said PCD to process said data transmitted to said PCD.

15. The method of claim 12, wherein said content server is a stream server.

16. The method of claim 12, wherein said transmitting data to said PCD comprises transmitting a data stream for a media content to said PCD, while said data stream is received and processed by said PCD for presentation of said media content to a user and said circuit block is operated in said power mode to perform at least one of receiving and processing said data stream.

17. The method of claim 16, wherein said power mode is selected based on at least a bitrate of said data stream.

18. The method of claim 16, wherein said data stream comprises compressed data, and said power mode is selected based on at least a compression ratio of said compressed data.

19. The method of claim 16, wherein said media content comprises video images and said power mode is selected based on at least a graphics resolution of said video images.

20. The method of claim 19, wherein said data stream comprises a television broadcast signal.

21. The method of claim 20, wherein said television broadcast signal comprises a sideband, said power mode indicator being transmitted in said sideband.

22. The method of claim 12, wherein said PCD communicates with said content server through wireless communication.

23. A portable communication device (PCD) for media content, comprising:
- a circuit block operable in a plurality of power modes, said circuit block exhibiting different levels of power consumption when operated in different ones of said power modes;
- a receiver for receiving, from a remote content server, media content and a power mode indicator indicative of a power mode selected from said plurality of power modes; and
- a power management module for setting said circuit block to operate in said power mode in response to receiving said power mode indicator.

24. The PCD of claim 23, which is a cellular telephone.

25. The PCD of claim 24, wherein said content server is a stream server.

26. The PCD of claim 25, wherein said circuit block is operated in said power mode to perform at least one of receiving and processing streamed data.

27. A content server for transmitting media content comprising:
- a power mode selector for selecting a power mode indicator indicative of a power mode selected from a plurality of power modes potentially available to a circuit block in a portable communication device (PCD), said circuit block exhibiting different levels of power consumption when operated in different ones of said power modes; and
- a transmitter for transmitting to said PCD said power mode indicator and data.

28. The content server of claim 27, wherein said content server is a stream server.

29. The content server of claim 28, wherein said power mode indicator is associated with a data stream for media content to be transmitted to said PCD such that said circuit block is operable in said power mode to receive or process, or both receive and process, said data stream for presentation of said media content to a user.

* * * * *